(12) United States Patent
Gerver et al.

(10) Patent No.: US 7,456,374 B2
(45) Date of Patent: Nov. 25, 2008

(54) COMPONENT HEATER

(75) Inventors: Lester S. Gerver, Quakertown, PA (US); Christopher David Hopkins, Vista, CA (US); Vladimir Yliy Gershtein, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 11 days.

(21) Appl. No.: 11/494,412

(22) Filed: Jul. 27, 2006

(65) Prior Publication Data

US 2008/0023466 A1  Jan. 31, 2008

(51) Int. Cl.
 *H05B 3/44* (2006.01)
(52) U.S. Cl. .................. 219/544; 392/423; 219/538
(58) Field of Classification Search ........... 219/242, 219/243, 251, 252, 254, 411, 516, 525, 533, 219/534, 535, 544, 548, 552; 392/424, 423, 392/487, 429, 500
See application file for complete search history.

(56) References Cited

U.S. PATENT DOCUMENTS

| | | | |
|---|---|---|---|
| 1,316,190 A | | 9/1919 | Sackerman |
| 2,426,976 A | * | 9/1947 | Taulman ..................... 219/525 |
| 3,519,023 A | | 7/1970 | Burns, Sr., et al. |
| 4,110,602 A | | 8/1978 | McDade |
| 4,121,093 A | | 10/1978 | Wainwright |
| 4,437,488 A | | 3/1984 | Taggart et al. |
| 4,749,843 A | * | 6/1988 | Abramson ................. 219/411 |
| 5,136,143 A | * | 8/1992 | Kutner et al. ............... 219/544 |
| 5,412,184 A | | 5/1995 | McGaffigan |
| 5,462,080 A | | 10/1995 | Plavidal et al. |
| 5,531,245 A | | 7/1996 | Sparks et al. |
| 6,060,691 A | | 5/2000 | Minami et al. |
| 6,230,745 B1 | | 5/2001 | Brooks |
| 6,330,395 B1 | | 12/2001 | Wu |
| 6,442,341 B1 | | 8/2002 | Wu |
| 6,536,458 B1 | | 3/2003 | Kindermann |
| 7,011,797 B2 | | 3/2006 | Bakke |
| 7,012,226 B1 | | 3/2006 | George |
| 2006/0081610 A1 | | 4/2006 | Wolff |

FOREIGN PATENT DOCUMENTS

EP  1529470 A1  11/2005

OTHER PUBLICATIONS

Watlow Heaters Catalog, #COR-HPC-110.
Chromalox Catalog, #P00956-17.

* cited by examiner

*Primary Examiner*—Thor S Campbell
(74) *Attorney, Agent, or Firm*—Joseph D. Rossi

(57) ABSTRACT

A heater for fluid flow components. The heater has heat transfer surfaces that engage the component. The transfer surfaces are mounted on jaws that are movable to engage the component. The jaws have massive portions that act as heat reservoirs to maintain a constant temperature in spite of rapid cooling when gas is allowed to expand freely from the component. The jaws are heated by electrical resistive heating elements that are sealingly mounted within the massive portions. The sealing engagement allows the heater to be used in hazardous environments.

15 Claims, 3 Drawing Sheets

COMPONENT HEATER

BACKGROUND OF THE INVENTION

The invention relates to devices for heating components such as valves, fittings, or other items related to controlling fluid flow.

Many industrial and commercial processes use compressed gas supplied from a reservoir, such as a tank or gas cylinder. The flow of gas from the reservoir, for example, a cylinder, is controlled by a valve, usually mounted directly on the cylinder. When a compressed gas is permitted to expand freely through a throttling device such as a valve, it undergoes the Joule-Thomson effect, a process by which the gas temperature increases or decreases during free expansion at constant enthalpy (no work extracted from the gas, no heat transfer to or from the gas). For most gases used in industrial applications, the conditions of pressure and temperature are such that the Joule-Thomson effect causes the gas to cool as it is released from the cylinder. The cooling can be significant and cause the moving parts of the valve to contract and jam, rendering the valve inoperable. Furthermore, moisture in the air within and surrounding the valve may condense and freeze within and/or on the valve, also rendering it inoperable. Any moisture in the gas will also condense in the valve passageways, accumulate, and choke off the flow of gas from the valve. There is clearly a need for a device that can prevent the malfunctioning of valves or other fluid flow devices due to overcooling upon free expansion of gas from a reservoir.

BRIEF SUMMARY OF THE INVENTION

The invention concerns a device for heating a component, such as a valve or other fluid flow component. The device comprises a heat conducting body having a massive portion forming a heat reservoir, and a surface extending from the massive portion. The surface is engageable with the component. A heating element is mounted on the massive portion of the body. The heating element provides heat to the heat reservoir. The surface transfers the heat to the component upon engagement between it and the component.

In one embodiment, the heat conducting body comprises a metal block and the heating element comprises an electrical resistive heater. In this embodiment, a cavity is positioned within the massive portion of the body. The cavity receives the electrical resistive heater, which is sealed within the cavity using an inert compound. This isolates the electrically resistive heater from the ambient to prevent ignition of explosive or flammable gases thus allowing the heater to be used in hazardous environments. The heating element may include a temperature sensor, for example a thermocouple, for controlling the temperature of the device. An insulating shroud is positioned surrounding the heat conducting body to prevent heat from escaping to the ambient and being wasted, thus conserving energy.

In another embodiment, the device according to the invention comprises a plurality of heat conducting bodies. Each body has a massive portion forming a heat reservoir. Each body also has a surface that extends from the massive portion to engage the component for transfer of heat to it. The device includes a plurality of heating elements. At least one heating element is positioned within each of the massive portions of each of the bodies. The heating elements provide heat to the heat reservoirs, and the surfaces transfer the heat to the component upon engagement between the surfaces and the component.

In a particular embodiment, the invention comprises first and second jaws that have respective first and second facing surfaces oppositely disposed. The jaws are adjustably movable for moving the surfaces toward and away from one another. A heating element is sealingly positioned within the first jaw for heating at least the first surface. The surfaces are movable into contact with the component to effect heat transfer to it. This embodiment may comprise an adjustably tightenable fastener connecting the first and second jaws to one another. Adjustment of the fastener adjustably moves the first and second jaws toward and away from one another.

DETAILED DESCRIPTION OF THE INVENTION

Figure 1:
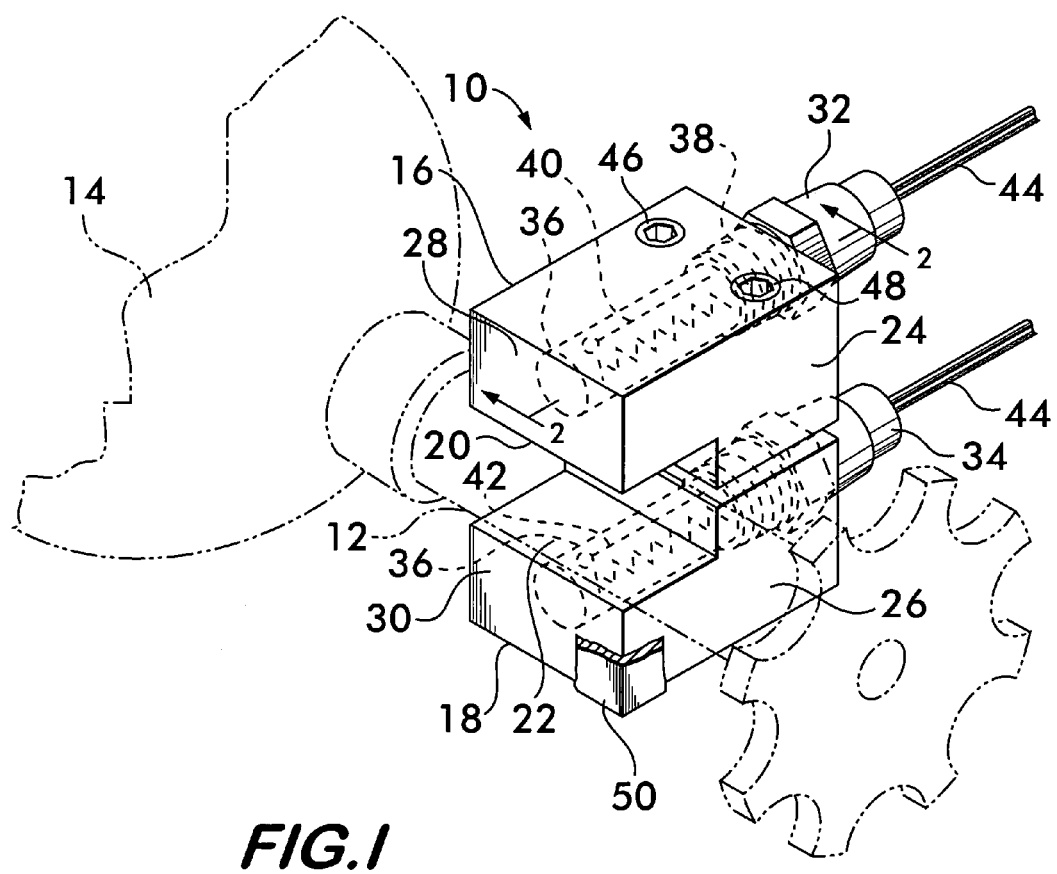
FIG. 1 is a perspective view of a device according to the invention for heating a component.
Figure 2:
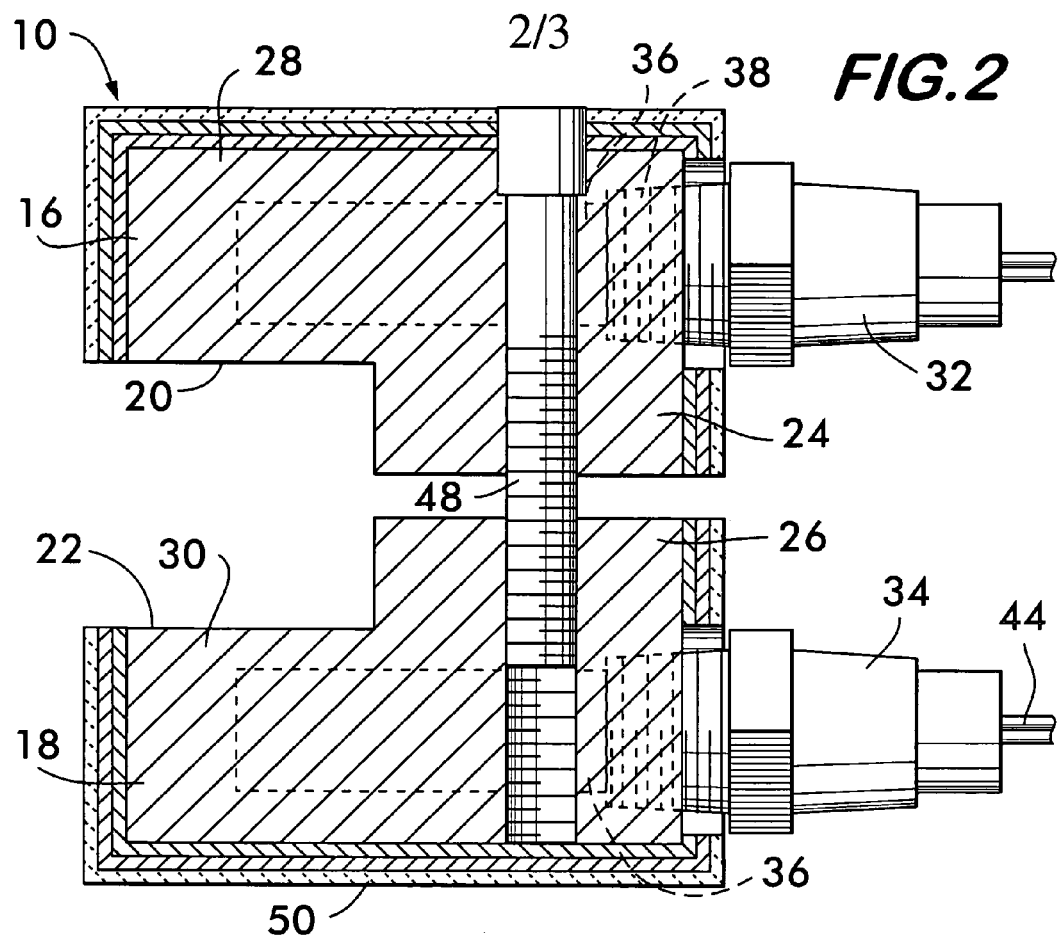
FIG. 2 is a sectional view taken at line 2-2 of FIG. 1.

FIG. 1 illustrates a heating device embodiment 10 according to the invention in position surrounding a valve 12 on a gas cylinder 14, shown in phantom line. Heater 10 has a pair of jaws 16 and 18 formed from blocks of a heat conducting material, such as metal. Aluminum, brass, copper and steel are examples of metals that may be used to good effect to form the jaws. Each jaw has a heat transfer surface, 20 and 22 respectively (see also FIG. 2). The surfaces engage the valve 12 or other component to be heated, and effect heat transfer to the valve mainly through conduction. Each jaw 16 and 18 also has a massive portion, 24 and 26 respectively, which serve as heat reservoirs. The heat reservoirs, by virtue of their relatively large mass, allow the heater 10 to accommodate sudden and rapid heat transfer transients, as may be occasioned by the sudden and prolonged opening of the valve, while maintaining a relatively stable demand for electrical power. The reservoirs also mitigate large temperature swings and help maintain the valve 12 at a relatively constant temperature despite the cooling effect associated with expansion of the gas from the cylinder as it is throttled through the valve. As shown in FIGS. 1 and 2, heat transfer surfaces 20 and 22 are respectively positioned on fingers 28 and 30 that extend from respective massive portions 24 and 26.

The heat source for the heater 10 is provided by electrical resistance heating. In the heater embodiment 10 shown in FIG. 1, there are two electrical resistance heater units 32 and 34. Each unit is positioned within a respective massive portion 24 and 26 of the jaws 16 and 18. Each massive portion has a cavity 36 that receives one of the heater units. The units may be mounted within the cavities using screw threads 38, thus allowing them to be replaced if they fail. Each heater unit may also have a dedicated temperature sensor 40 and 42 respectively. The temperature sensors may be thermocouples, optical sensors or other transducers that produce a signal indicative of temperature. The temperature sensors may be integral with the heating units and provide temperature sensing capability for feedback control of the heater 10 as described below. It is desirable to control both the low and the high temperature limits of the heater. Control of the low temperature limit keeps the valve operational, while control of the high temperature limit avoids damage to valves having temperature sensitive seals. It also allows the heater 10 to be used with gases for which there is an upper temperature limit, set, for example, by the process in which they are used, or for reasons of safety.

Heater units 32 and 34 are sealingly positioned within the cavities 36 and the units themselves are further sealed with an inert "potting" material where their electrical leads 44 emerge. Potting materials such as silicone are advantageous because they do not readily degrade when exposed to high temperature oxygen, maintain their elastic characteristics and are dimensionally stable over a wide temperature range, thereby providing a durable, gas tight seal. Sealing the heating units within the jaws 16 and 18 allow the heater 10 to be used in hazardous environments, such as Class I Division 1 environments as defined under the National Electrical Code, where the heater would be exposed to flammable, combustible or explosive gases or vapors (for example acetylene, hydrogen, gasoline, methane) under normal working conditions. Further safety features include leads 44 insulated, for example, with Teflon or other insulation materials appropriate for the expected environment.

As best illustrated in FIG. 2, jaws 16 and 18 are connected to one another by adjustable screw fasteners 46 and 48 (46 being shown in FIG. 1). The fasteners extend between the jaws 16 and 18 and may be turned to move the heat transfer surfaces 20 and 22 toward and away from one another thereby providing a clamping action that allows the heater 10 to be temporarily affixed to the valve 12. This allows the heater to be used with various valves and on various installations and provides increased versatility over heaters that are dedicated to a particular valve or installation. Note that one or both of the heat transfer surfaces may have a particular shape that is complementary to the shape of the valve. This promotes heat transfer by increasing the contact areas between the heater and the component, and also helps secure the heater to the component. The jaws 16 and 18 of heater 10 are surrounded by an insulating shroud 50. Shroud 50 allows the heater to be manually handled when hot, and prevents loss of heat to the ambient, thereby conserving electrical energy. Shroud 50 may comprise, for example, an inwardly facing reflective surface covered with outer layers of fiberglass and refractory material.

Figure 3:
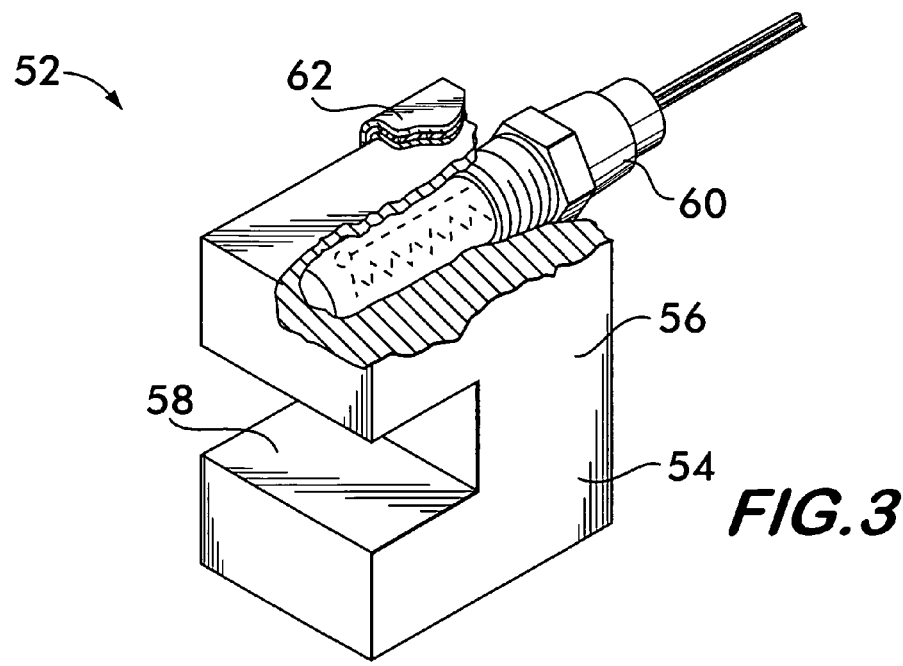
FIG. 3 is a partial cut-away perspective view of another embodiment of a device for heating a component.

FIG. 3 shows another embodiment 52 of a heater according to the invention. Heater 52 is formed from a single heat conducting body 54 having a massive portion 56 that forms a heat reservoir. A heat transfer surface 58 projects from and, in this example, is surrounded by, the massive portion 56. A heating element 60 is sealingly mounted within the massive portion 56. The heating element 60 is similar to the heating units described above in that it is a potted electrical resistive heater and configured so as to allow the heater 52 to be used in hazardous environments. The valve or other component to be heated is received within the massive portion in facing relation with the heat transfer surface 58. Heat transfer is again, mainly through conduction, although radiative heat transfer is also feasible. Again, an insulating shroud 62 may be used to conserve energy by mitigating heat loss to the ambient.

Figure 4:
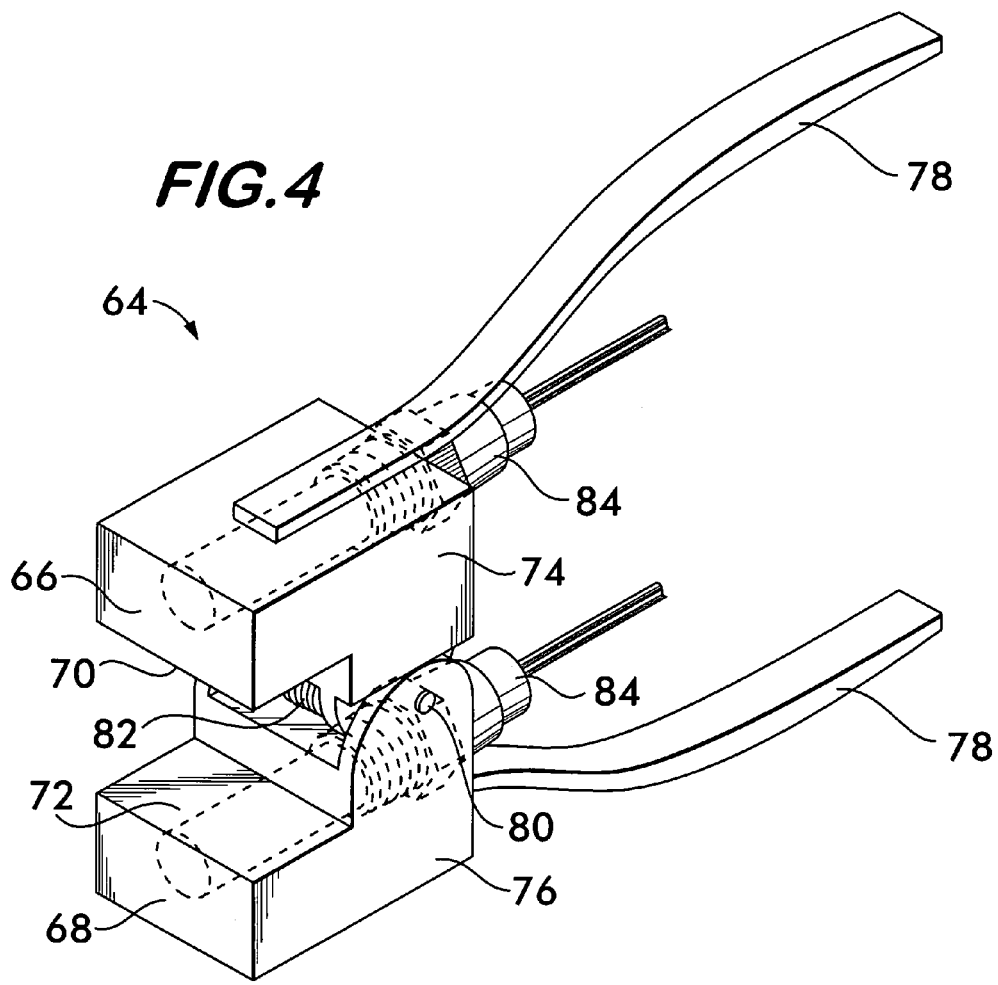
FIG. 4 is a perspective view of another embodiment of a device for heating a component.

FIG. 4 illustrates another embodiment of a heater 64 according to the invention. Heater 64 comprises jaws 66 and 68. Each jaw has a respective heat transfer surface 70 and 72 projecting from a respective massive portion 74 and 76 forming heat reservoirs. The jaws are mounted on handles 78 that are pivotable about a hinge 80 to move the heat transfer surfaces toward and away from one another. The handles 78 may be spring biased, for example by a coil spring 82 to provide a clamping action permitting the jaws to forcibly engage a component. One or both of the jaws may have an electrically resistive heating unit 84 as described above.

Figure 5:
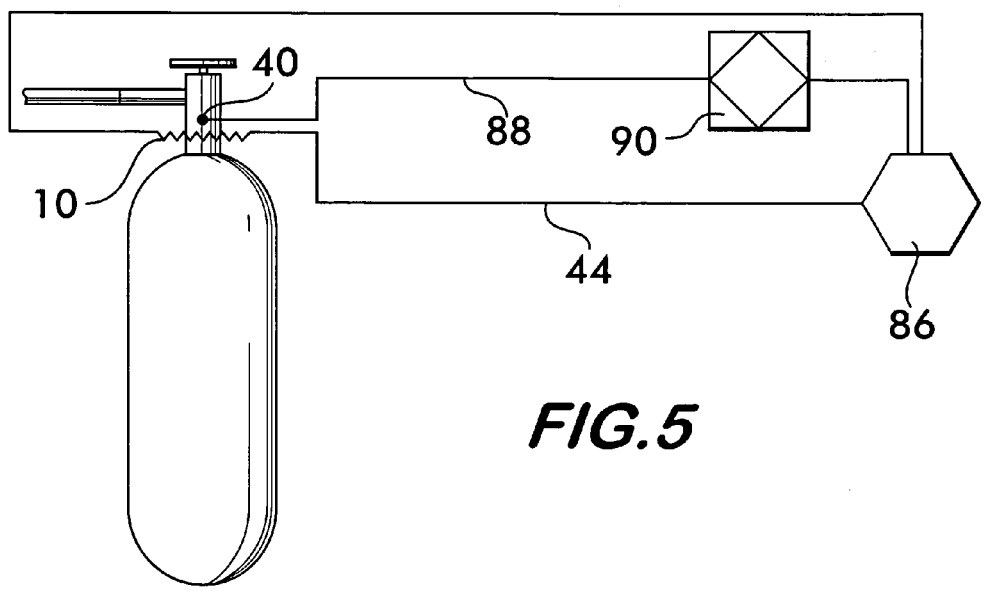
FIG. 5 is a schematic diagram illustrating use of a heating device with a control system for heating a component.

FIG. 5 shows a schematic diagram illustrating the heater according to the invention in operation. Heater 10 is used by way of example, it being understood that FIG. 5 and the description related to it apply to any embodiment of the invention. Electrical leads 44 are connected to a power supply 86, and leads 88 from temperature sensors 40 or 42 are connected to a controller 90, for example a microprocessor having resident software, or a programmable logic controller. The controller 90 in turn, controls the power supply 86, and regulates the flow of power to the heater 10. Information describing the temperature within the jaws, in the form of electrical signals from the temperature sensors 40 and/or 42, is provided to the controller through leads 88. In response to the temperature information, the controller controls the power supply 86 and provides power to the heater when the temperature is below a predetermined lower limit appropriate to the valve and the process of which it is a part. Conversely, if the temperature signals indicate that the predetermined high temperature limit is reached, power is reduced or cut off to prevent the temperature in the jaws from exceeding the desired upper limit. Control of the power supply may be a simple on-off regime, or it may be a more sophisticated proportional scheme as required for a particular application.

Heating devices according to the invention may be used on valves as well as other fluid flow components such as orifices, expanders, strainers and the like wherein cooling occurs due to free expansion of a gas. Heaters according to the invention provide increased versatility over prior art heaters that are integral within a valve or other component in that they may be easily adapted for use with many different valve designs. The sealed nature of the heating elements allows for use of the heater in hazardous environments and the heat reservoir formed by the massive portion of the heater jaws provides for enhanced temperature stability.

The invention claimed is:

1. A device for heating a component, said device comprising:
    a plurality of metal blocks, each said metal block having a massive portion forming a heat reservoir, each said metal block having a surface extending from said massive portion, each said surface being engageable with said component, said metal blocks being movably connected to one another by a plurality of threaded fasteners, turning of said fasteners moving said metal blocks toward and away from one another so as to bring said surfaces into and out of engagement with said component;
    a plurality of heating elements, at least one of said heating elements being positioned within each of said massive portions of said metal blocks, said heating elements providing heat to said heat reservoirs, said surfaces transferring said heat to said component upon engagement therewith.

2. A device according to claim 1, wherein said heating elements comprise electrical resistive heaters.

3. A device according to claim 2, further comprising a cavity positioned within each of said metal blocks, each of said cavities receiving at least one of said electrical resistive heaters in sealing engagement, thereby isolating said electrical resistive heaters from the ambient.

4. A device according to claim 1, further comprising a temperature sensor mounted on one of said metal blocks for controlling the temperature of said device.

5. A device according to claim 4, wherein said temperature sensor comprises a thermocouple.

6. A device for heating a component, said device comprising:
- first and second jaws having respective first and second facing surfaces oppositely disposed;
- an adjustably tightenable fastener connecting said first and second jaws to one another, adjustment of said fastener adjustably moving said first and second jaws toward and away from one another;
- a heating element sealingly positioned within said first jaw for heating at least said first surface, said surfaces being movable into contact with said component to effect heat transfer thereto.

7. A device according to claim 6, wherein said fastener comprises a threaded fastener extending between said first and second jaws.

8. A device according to claim 6, wherein said first jaw comprises a metal block sized so as to form a heat reservoir, and said heating element comprises an electrical resistive heater.

9. A device according to claim 8, further comprising a cavity positioned within said block, said cavity receiving said electrical resistive heater in sealing engagement, thereby isolating said electrical resistive heater from the ambient.

10. A device according to claim 9, further comprising a second heating element sealingly positioned within said second jaw for heating said second surface.

11. A device according to claim 10, wherein said second jaw comprises a second metal block sized so as to form a second heat reservoir, and said second heating element comprises an electrical resistive heater.

12. A device according to claim 11, further comprising a second cavity positioned within said second block, said second cavity receiving said second electrical resistive heater in sealing engagement, thereby isolating said second electrical resistive heater from the ambient.

13. A device according to claim 6, wherein said heating element includes a temperature sensor for controlling the temperature of said device.

14. A device according to claim 6, further comprising a hinge, said hinge being positioned between and attached to said first and second jaws and pivotably connecting said jaws to one another.

15. A device according to claim 14, further comprising a pair of handles, each said handle being attached to one of said jaws, said handles facilitating pivoting motion of said jaws toward and away from one another.

* * * * *